United States Patent
Frölich et al.

[11] Patent Number: 5,127,512
[45] Date of Patent: Jul. 7, 1992

[54] METHOD OF OPERATING A MAGNETICALLY DRIVEN VIBRATING CONVEYOR AND APPARATUS FOR IMPLEMENTING THE METHOD

[75] Inventors: Bernhard Frölich, Walldorf; Werner Mildenberger, Altenstadt; Siegfried Hanemann, Rodgau, all of Fed. Rep. of Germany

[73] Assignee: Licentia Patent-Verwaltungs-GmbH, Frankfurt, Fed. Rep. of Germany

[21] Appl. No.: 536,881

[22] Filed: Jun. 13, 1990

[30] Foreign Application Priority Data

Jun. 13, 1989 [DE] Fed. Rep. of Germany ..... 89110652

[51] Int. Cl.⁵ .............................................. B65G 27/00
[52] U.S. Cl. ................................... 198/751; 198/766; 198/769
[58] Field of Search .............. 198/609, 751, 752, 762, 198/767, 769, 766

[56] References Cited

U.S. PATENT DOCUMENTS

| | | | |
|---|---|---|---|
| 2,819,788 | 1/1958 | Howard | 198/609 |
| 4,378,064 | 3/1983 | Brown | 198/769 |
| 4,961,491 | 10/1990 | Falconer | 198/769 X |

FOREIGN PATENT DOCUMENTS

| | | | |
|---|---|---|---|
| 8602058 | 4/1986 | European Pat. Off. | 198/751 |
| 1111720 | 7/1961 | Fed. Rep. of Germany | |

OTHER PUBLICATIONS

"Grundbegriffe der Schwingfördertechnik," [Basic Concepts of Vibratory Conveying], by AEG-Telefunken, Vibration and Welding Division.
Chemie-Technik [Chemical Engineering], "Vibrationsfördersystem mit Resonanzfrequenz-Steuerung," vol. 14 (1985), No. 12, pp. 45-47.
Gerd Fechner and Wolfgang Steuer, "Magnetvibratoren von AEG-TELEFUNKEN-Antriebe fur die Schwingungstechnik", Techn. Mitt. AEG TELEFUNKEN 71, pp. 94-97, (1981).

Primary Examiner—Joseph E. Valenza
Assistant Examiner—Tuan N. Nguyen
Attorney, Agent, or Firm—Spencer & Frank

[57] ABSTRACT

A method of operating a magnetically driven vibrating conveyor under different conveying loads with a constant excitation frequency. The natural frequency of the conveyor is set without a conveying load so that with a load the natural frequency of the conveyor approaches the operating frequency of the conveyor with increasing attenuation and, with a maximum load of material to be conveyed, the natural frequency of the conveyor is approximately equal to the excitation frequency of the dual mass vibratory system. Additionally, the vibration amplitude of the dual masses of the magnetic drive is regulated to a predetermined value.

14 Claims, 4 Drawing Sheets

METHOD OF OPERATING A MAGNETICALLY DRIVEN VIBRATING CONVEYOR AND APPARATUS FOR IMPLEMENTING THE METHOD

BACKGROUND OF THE INVENTION

The present invention relates to method of operating a magnetically driven vibrating conveyor having a dual mass vibratory system under different conveying loads with a constant excitation frequency and to an apparatus for implementing the method. Such a method is disclosed in the in-house publication entitled, "Grundbegriffe der Schwingfördertechnik"[Basic Concepts of Vibratory Conveying], by AEG-Telefunken, Vibration and Welding Division.

The following discussion refers to FIGS. 1 and 2 of the present drawings, and it is assumed that the vibrating conveyor has a magnetic vibrator as its drive.

The vibrating conveyor has a natural, that is, resonant frequency $f_e$ which shifts toward lower values with increasing masses in the dual mass vibratory system. In a known manner, the resonance curve is a function of the excitation frequency $f_a$, i.e. it is flatter, the greater the attenuation. FIG. 2 shows vibration amplitude as a function of the quotient formed from the excitation frequency and the natural frequency are nearly the same. Operation of the vibrating conveyor in the resonance range where the excitation frequency of the magnetic drive and natural frequency of the conveyor is more critical and labile with respect to the vibration amplitude, the less attenuation there is. On the other hand, it is desirable to have as little attenuation as possible in order to keep power losses low. The operating point is therefore customarily placed on the left or right branch of the resonance curve. Operation is more stable the farther the operating point is removed from the point of resonance where the excitation and natural frequencies are equal. Consideration is first given to the case of supercritical operation, that is, the case where the natural frequency is lower than the excitation frequency ($f_a/f_e > 1.0$), with it being assumed that the excitation frequency is a constant value. By increasing the conveying material load, attenuation is increased and the vibration amplitude is reduced by the path E-F. This increase in attenuation is explained by the fact that, for a conveying material that is increasingly granular, the sum of the friction between individual bodies becomes higher, resulting in an increase in attenuation. The increased conveying material load simultaneously couples in a larger mass so that the natural frequency of the vibrating conveyor drops (path F-G). This not only increases the distance from the point of resonance but also causes the amplitude of the vibrations to be reduced.

In subcritical operation, the natural frequency is higher than the excitation frequency so that $f_a/f_e < 1.0$. In contrast to supercritical operation, the coupling in of a larger mass results in an increase in amplitude (curve A-B). Here, again, however, the vibration amplitude decreases with increasing attenuation (curve B-C). Attenuation and coupling in of masses thus counteract one another, resulting in stabilization of operation. Since in the case of resonance the vibrations are unstable, the system is set so that, under consideration of all influences from the load, the distance from the point of resonance is so great that stable operation results. Operation at resonance is not possible without additional measures. In order to keep the influence of coupling in and attenuation by the conveyed material as low as possible, it is possible to select the masses of the operating side of the vibrating conveyor, and particularly those of the free side as large as possible. This results in good vibration stability even near resonance. However, such a design requires that the magnetic vibrator have a relatively large mass which would be undesirable from a point of view of maneuverability and also for reasons of costs. The optimum ratio of operating mass to free mass lies at about 3 : 1 to 4 : 1. In this case, the vibratory system is customarily adjusted so that, under maximum influence from the load, a distance from the point of resonance of more than about 5% results.

The control of an electromagnetically excited dual mass vibratory system is disclosed in German Auslegesschrifft AS 1,111,270. The vibration amplitude corresponding to the end position of a mass in a vibratory drive can be adjusted by connecting transformers, a choke or resistors to its input. In order to regulate a given vibration amplitude to the desired value, a magnetic amplifier is connected to the input of the vibratory drive and is regulated automatically as a function of the difference between the greatest and the smallest distance between the operating and free side masses. In this connection, it is also known to perform resonance vibration control (e.g. see Chemie-Technik [Chemical Engineering], Volume 14 (1985), No. 12, pages 45 and 46) to effect amplitude vibration control. For this purpose, a frequency feedback is provided from the vibrating conveyor to the control circuit which thus synchronizes itself to the natural resonance of the conveyor system. In order to prevent the conveying amplitude from overshooting, a further amplitude control circuit is required to control the excitation energy. Although this control ensures an accurately proportional behavior of the vibration amplitude relative to the set value, independently of all extraneous influences, it is extremely expensive since no fixed relationship exists between the excitation frequency and the mains frequency. Frequency control is necessary.

In summary, it can thus be stated that for optimum conveying operations, a vibrating conveyor, its adjustment and its vibratory drive must meet the following conditions:

In order to realize good efficiency, work should take place as close to resonance as possible since, except for attenuation losses, the full excitation energy is transferred to the vibrating conveyor. Relative to the working mass, the free mass should be as small as possible. Since overshooting of the operating amplitude could have the result that core and armature of the vibratory drive hit one another in the air gap and might possibly destroy one another, such undesirable overshooting must be prevented.

SUMMARY OF THE INVENTION

It is an object of the invention to provide a method of operating a vibrating conveyor at a constant excitation frequency so that high efficiency is ensured without the damaging effects of overshooting, with the expenditures required for controls being kept as low as possible.

This is accomplished according to the present invention in that the natural frequency of the vibrating conveyor without the load of the material to be conveyed is selected and adjusted so that, under the load of the material to be conveyed, the natural frequency approaches the operating frequency of the vibrating conveyor with increasing attenuation and, under maximum load, is approximately equal to the excitation frequency of the magnetic drive, and the overall oscillation amplitude of the magnetic drive is regulated to a predetermined value.

The method can be implemented in a simple manner and with good efficiency. This essentially requires, under consideration of the presumed conveying load, the setting of the natural frequency of the vibrating conveyor on the left branch of the curve of FIG. 2. That means that the trough of the vibrating conveyor, when empty, is subjected to internal attenuation and thus, since it is removed from the point of resonance, its vibrating behavior is more stable than in the case of resonance. Although under maximum load, when a mass has been coupled in, the operating frequency lies at the resonant frequency, due to the internal friction of the material being conveyed, the system experiences greater attenuation (external attenuation) as a result of the internal friction of the material being conveyed so that the overshooting oscillations are not too strong. In any case, this type of operation results in such a high attenuation for no-load operation and also for operation at resonance, that the vibration amplitude can be regulated to the desired value with relatively little effort.

It is particularly favorable if the vibration amplitude of the vibrating conveyor is regulated to a predetermined value. The vibration amplitude is here understood to mean the difference between the greatest and the smallest distance between the free mass and the working mass. The control system takes care that there is no hitting together of the vibrating components in any operating state, including the case of resonance. The control system operates independently of the set frequency and can be implemented by simple means. Due to the regulation, it is possible to tune the natural frequency so that, under consideration of the operating frequency developing under a conveying load, with maximum load the operating frequency equals the natural frequency of the vibrating conveyor including the load in the form of the material being conveyed or lies very close to the resonant frequency. This signifies a considerable increase in performance with given drive components. This method also results in the fact that the material being conveyed can be moved with the lowest possible consumption of energy. The conveyance of a certain load with minimum consumption of energy also results in a reduction of the required power for the magnet and thus of the costs for the electrical drive components. Usually, the system is tuned by matching the mass ratios of the free mass and the working mass, for example by adding or removing weights at the free mass or by matching the spring constants, for example by the addition or removal of springs. It has a favorable effect on the system in that, in the case of resonance ($f_a = f_e$), the load in the form of the material being conveyed produces a relatively high attenuation. Often the vibration amplitudes under heavy attenuation lie below the vibration amplitudes that can be realized by means of a controller so that the controller need not become active in such a case. However, the controller ensures that, if there is a change in attenuation, no undesirably high vibration amplitudes occur, that is the regulation of the vibration amplitude begin only after there is a deviation from a predetermined vibration amplitude.

According to a further aspect of the invention, an apparatus for operating a magnetically driven vibrating conveyor having a dual mass vibratory system under different conveying loads and at a constant excitation frequency includes, an actual value pickup for the overall vibration amplitude. This pickup is disposed between the two masses and is connected with a comparator to which is fed a desired value for the overall vibration amplitude and whose output is connected with a controller which influences the supply of energy to an electromagnetic drive by way of a phase angle and/or phase chopping control or by way of a control of the amplitude of the applied voltage. The drive is disposed between the free mass and the working mass and, under maximum conveying load, the natural frequency of the vibrating conveyor is equal to the excitation frequency.

The invention will be described in greater detail with reference to an embodiment that is illustrated in the drawing figures and which will reveal further features and advantages.

DESCRIPTION OF THE PREFERRED EMBODIMENTS

Figure 1A:
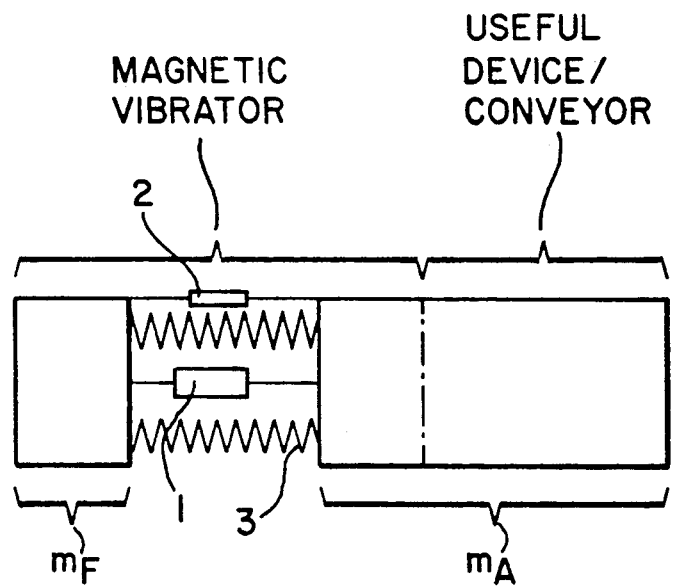
FIGS. 1a and 1b are schematics depicting a dual mass vibratory system.

In a dual mass vibratory system as shown in FIG. 1a, the natural frequency is calculated according to the following formula:

$$f_e = \frac{1}{2 \cdot \pi} \sqrt{\frac{C}{m_R}}$$

where $$m_R = \frac{m_F \cdot (m_A + m_{Ga})}{m_F + m_A + m_{Ga}}$$

where $m_R$ is the resulting mass, $m_F$ is the free mass and $m_A$ is the working mass, while $m_{Ga}$ is the mass of the bulk material that is coupled in, i.e. the material that shall be conveyed. This indicates how the natural frequency shifts under the influence of the bulk material. For example, at $m_F = 10$ kg, $m_A = 30$ kg and with a spring constant C of 94,650 N/m (=928.517 kg/s$_2$), the vibratory system has a natural frequency of 56 Hz in the no-load state.

Figure 1B:
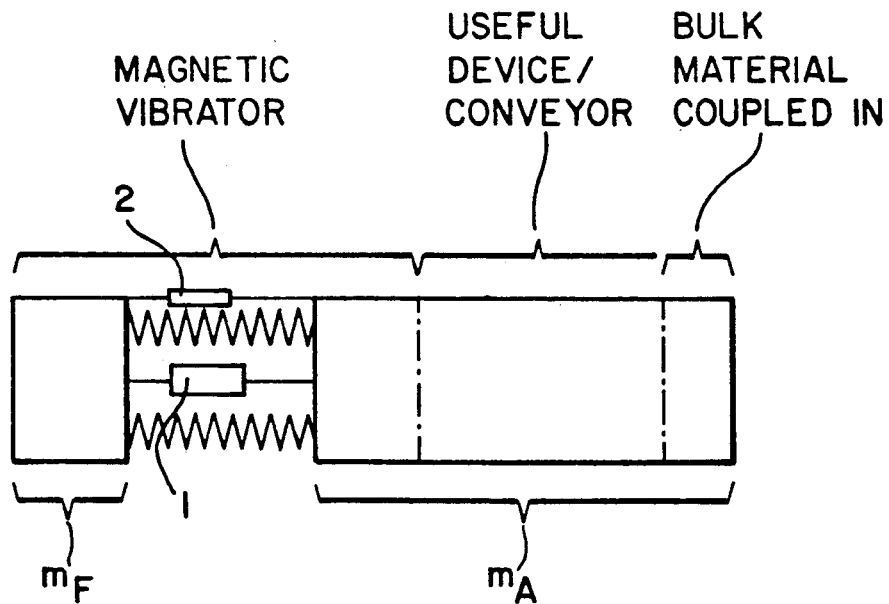

If one considers the vibratory system loaded with bulk material, two effects occur, as previously discussed, which counteract one another, thus as known only part of the mass of the bulk material acts on the working side as a coupled-in mass and is thus included in the calculation of the natural frequency (see FIG. 1b). This causes the mass on the working side $m_A$ to be increased and thus the natural frequency to be decreased.

With a bulk material load of 120 kg and a rated coupled-in mass of 20%, this natural frequency drops to 52.8 Hz. The influence of the reduction in natural frequency and attenuation on the vibration amplitude can be seen at points A, B, C in FIG. 2.

Figure 2:
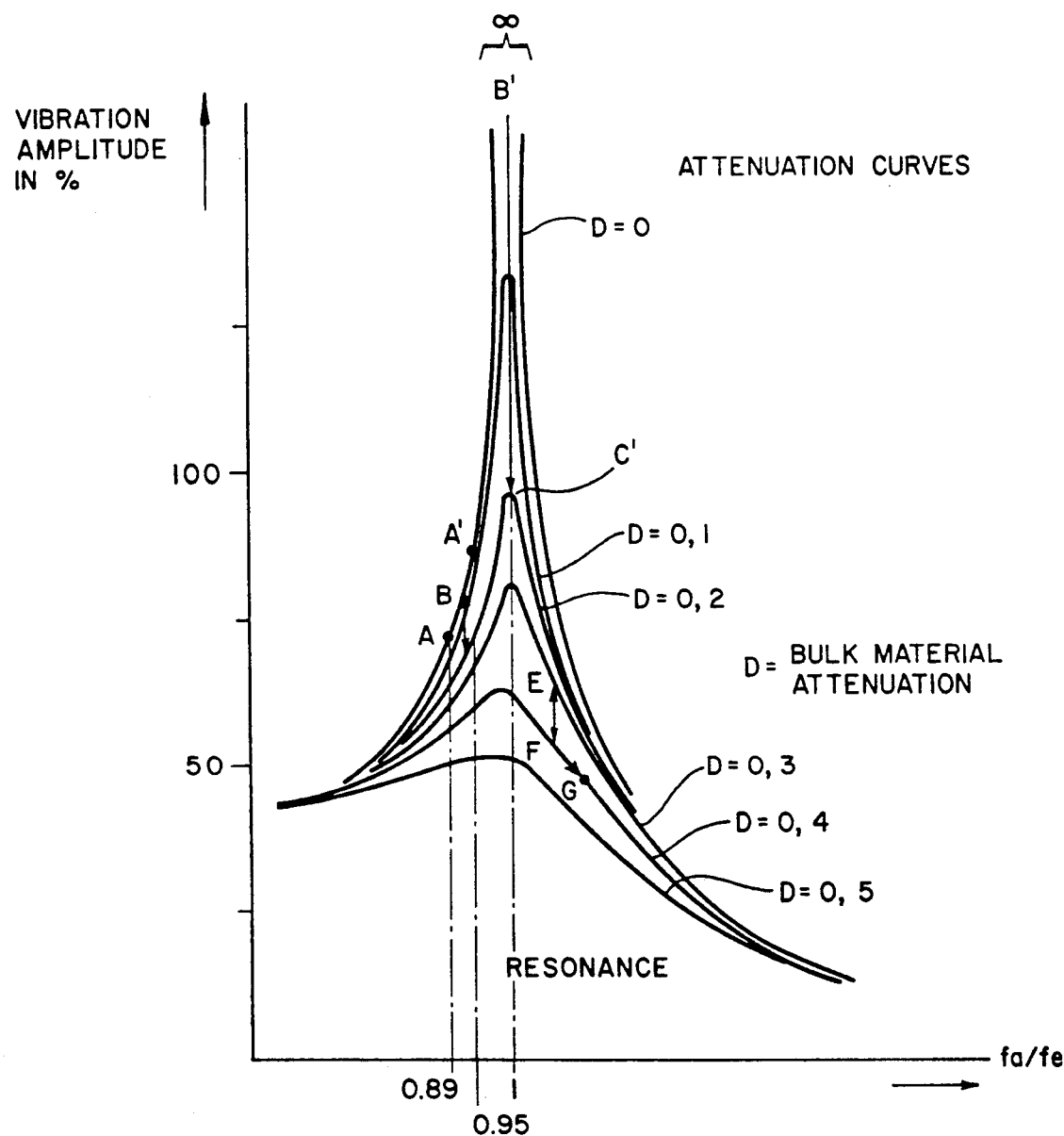
FIG. 2 is a diagram which shows the vibration amplitude as a function of the ratio of excitation frequency to natural frequency.

If, with a constant mass ratio $m_A : m_F$ and the same spring constant C, the natural frequency is tuned to 53 Hz as described before, the system, without attenuation from bulk material (D=0), is in state A' (FIG. 2). The natural attenuation of the system causes the vibration amplitude to remain relatively constant, that is the amplitude can be kept constant by simple means. This would not be the case if the system were in resonance ($f_a = f_e$). This unstable operation (point B') requires a faster and more complicated type of control.

If, in the above example, the bulk material load is 120 kg, a coupling in of 20% increases the mass on the working side by 24 kg. This results in a natural frequency of 50 Hz. The vibratory system would thus be in resonance. However, due to the attenuation by the bulk material, point B' (FIG. 2) is not reached. A point C' appears on one of the attenuation curves therebelow. Thus similar amplitudes are realized as in the no-load state. The regulation may be relatively simple since the attenuation by the bulk material continuously removes energy. The advantages of the described operation are that the vibratory system under maximum load operates at the optimum operating point (i.e. resonance) and thus at maximum efficiency and this is accomplished by the attenuation of the bulk material which is controlled relatively easily. As shown in FIG. 2, this is clearly noticeable upon a comparison of the realizable useful vibration amplitudes at the same mass ratios. Inversely, with a given working mass, coupled-in mass and excitation frequency, the natural frequency $f_e$ to be set for the no-load state can also be determined according to the above formula.

At an excitation frequency of 50 Hz, an $m_A$ of 30 kg for a coupled-in mass of 24 kg and a spring constant of C=94,650 N/m, the free side must have a mass, according to the above formula, of 11.4 kg in order to reach a natural frequency of 50 Hz. With the above formula, the natural frequency to be set without material being conveyed, that is, for the no-load state of $m_{Ga}=0$, is calculated at 53 Hz. Often it is desirable to use the mains frequency or an integer multiple or a true fraction of the mains frequency as the excitation frequency, since multiples or true fractions can be obtained from the mains frequency in a simple manner.

In a preferred embodiment of the invention the natural frequency of the conveyor without a conveying load is set to a value which lies about 5% above the excitation frequency with a mass ratio between the working side mass and the free side mass adjusted to about 3 : 1. Additionally, the natural frequency of the conveyor in the no-load state is desirably set so that the operating frequency resulting under maximum conveying load is equal to the excitation frequency of the signal exciting the magnetic drive.

The purpose of the control is to keep the overall vibration amplitude of the dual mass system constant and thus prevent the two masses from striking one another. The path of the two masses relative to one another or any other parameter depending thereupon can be employed as the regulating value. This includes, among others, the vibration path, the vibration velocity and spring forces.

Since the amplitude of the useful vibrations is a function not only of the overall vibration amplitude but also of other factors, such as, for example, the mass ratio $m_F : m_A$, it may be appropriate to superpose a useful vibration amplitude control over the overall vibration amplitude control. Useful vibration amplitude is understood to mean that vibration amplitude which refers to a fixed first point, that is, the vibration amplitude determinative for the material being conveyed It is also possible to provide a non-linearity in the regulation to the extent that regulation takes place only above a certain vibration amplitude. In the case of resonance with heavy attenuation, the control may then be ineffective if the vibration amplitude is less than the predetermined desired vibration amplitude. The actual vibration amplitude is monitored, for example, by a vibration amplitude discriminator or by a switch which responds when a predetermined threshold has been exceeded beginning with which the regulation becomes effective.

Figure 3:
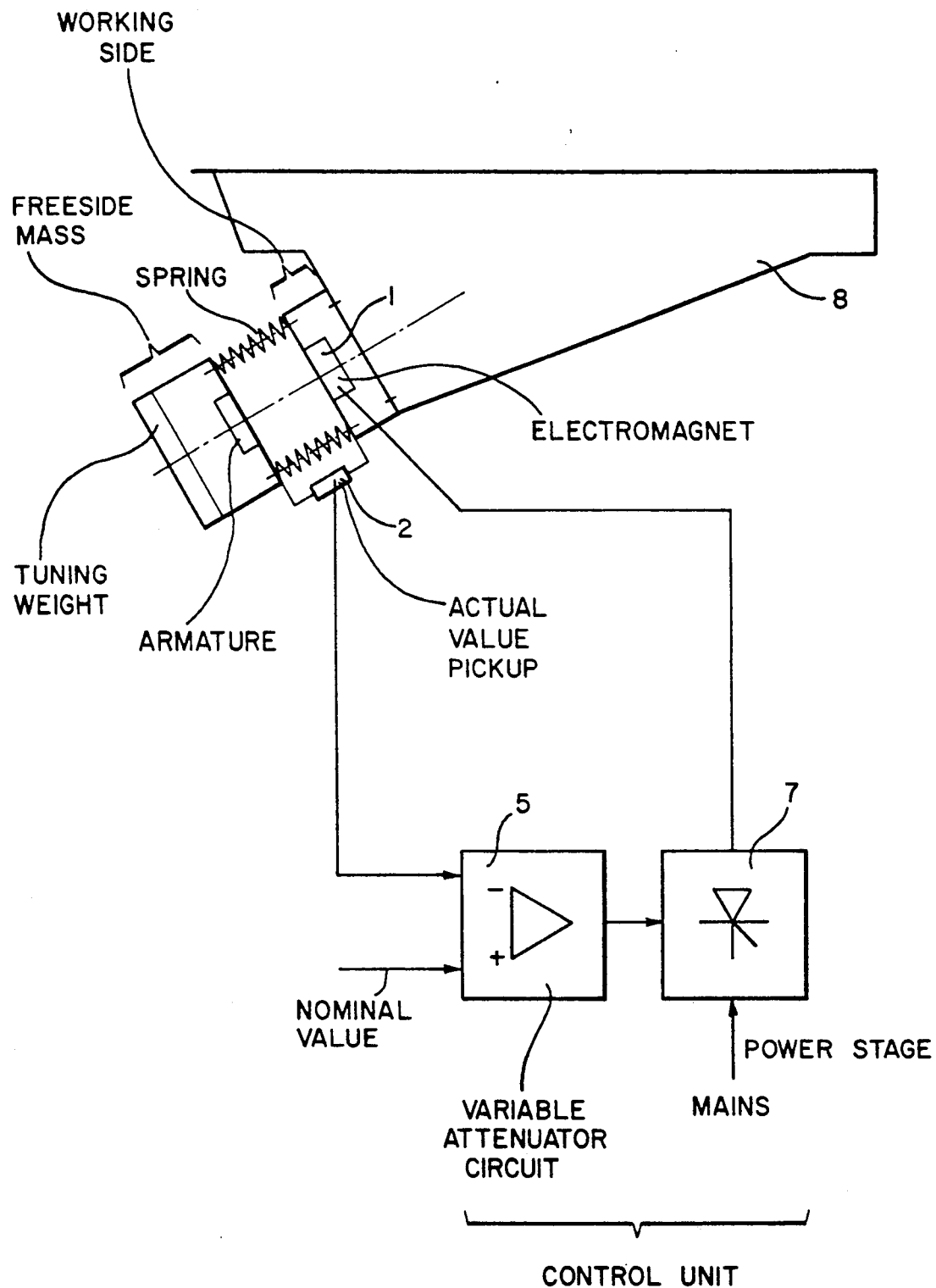
FIG. 3 is a more detailed schematic showing mechanical and electrical components.

Referring to FIGS. 1a, 1b and 3, an electromagnetic drive 1 is disposed between the free mass $m_F$ and the working mass $m_A$ for vibrating a useful device/conveyor 8. A spring 3 may also be disposed between masses $m_F$ and $m_A$ as previously discussed. Also provided is an actual value pickup 2 which picks up the overall vibration amplitude between free mass $m_F$ and working mass $m_A$. Drive 1 and actual value pickup 2 are shown only symbolically in the Figures. Actual value pickup 2 is part of a control circuit and is connected with a comparator 5 (FIG. 3) which receives a desired value for the overall vibration amplitude. From this, the comparator determines the deviation which, in a control member 7 (which may take various forms as discussed below), influences the energy supply for the drive.

The supply of power and thus the vibration amplitude are advisably controlled by control unit 7 by way of a phase angle or a phase chopping control method. It is also possible to regulate the amplitude of the voltage supplied to the vibratory drive by way of a transistor. Additionally, it is possible to pulse width modulate the applied voltage. The regulation is made independently of the operating frequency. Therefore, a structurally simple controller is sufficient. Due to operation at or near the resonant frequency under maximum load of conveying material, an optimum power to conveying ratio can be realized. The controller takes care that, in the case of resonance, no damage occurs as a result of excessive vibration amplitudes. In particular, the controller may have a longer response time, that is, a response time which is longer than the period at resonance. The reason for this is that the vibration amplitudes at resonance, due to the heavy attenuation, increase only slowly. It is thus not necessary for the controller to react to vibrations immediately, that is, within a resonance period; it may also react with a delay.

Figure 4:
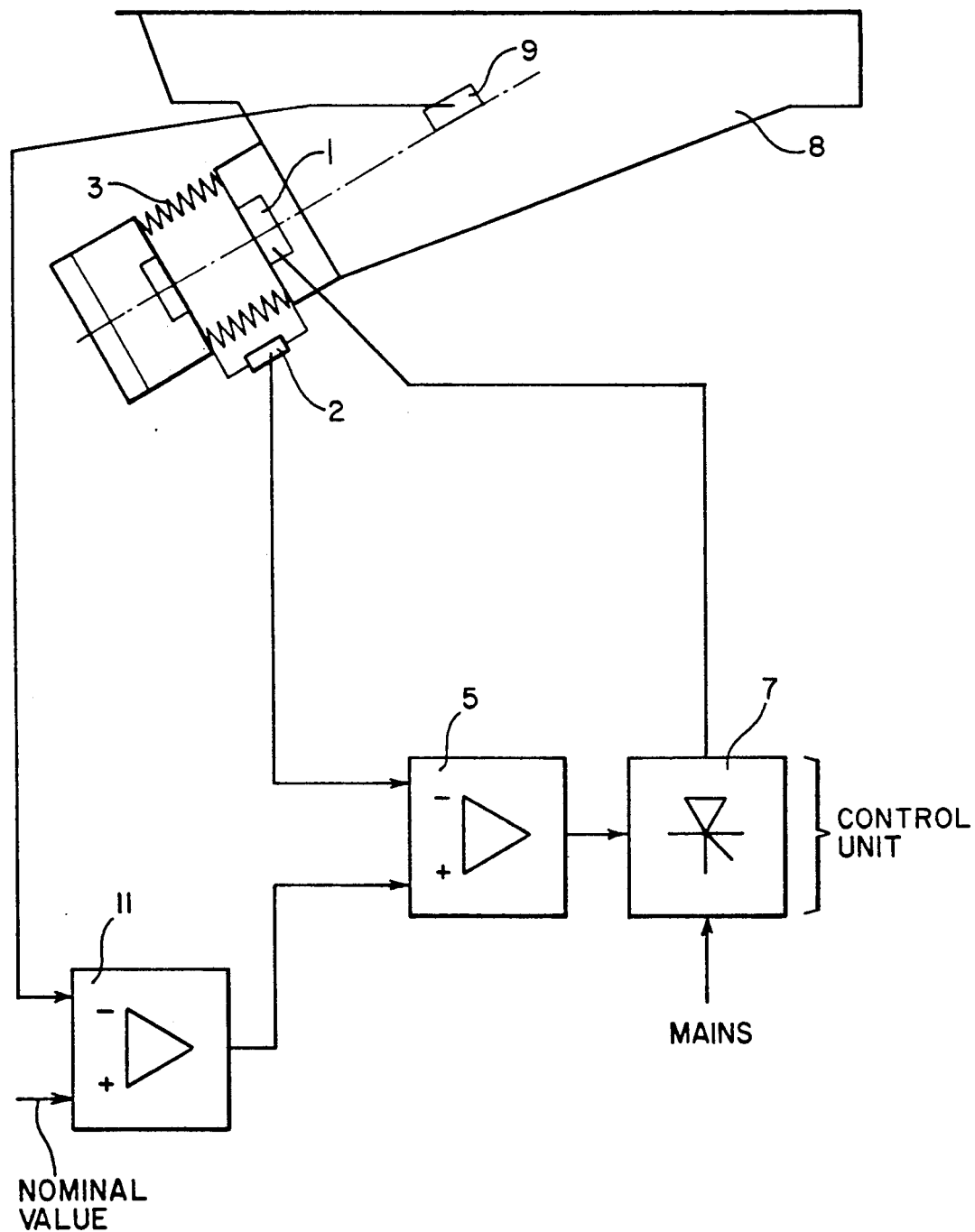
FIG. 4 is a schematic similar to FIG. 3 showing a superposed control unit.

Referring to FIG. 4 there is shown a schematic similar to FIG. 3 which additionally includes a second actual value pickup 9 for detecting vibrations of the useful device/conveyor 8. The output of actual pickup 9 is fed to a comparator 11 where it is compared to a nominal (predetermined) value. The output of comparator 11 is fed to comparator 5 in place of the nominal value shown in FIG. 3 for superposing a conveyor vibration amplitude control over the vibration amplitude control resulting from actual value pickup 2 which controls only the air gap between masses $m_F$ and $m_A$. FIG. 4 thus operates in the way of a master-slave-control and guarantees constant amplitudes even under heavy conveying loads. Thus, when normally the working side amplitude becomes smaller and the free side amplitude becomes greater the sum of both is held constant by the control unit with the superposed control.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method of operating a magnetically driven vibrating conveyor under different conveying loads with a constant excitation frequency, the conveyor including a dual mass vibratory system coupled to a magnetic drive which is excited by a signal having an excitation frequency for vibrating the dual masses, said method comprising:

setting the natural frequency of the conveyor without a conveying load so that, with a load of material to be conveyed, the natural frequency of the conveyor approaches the operating frequency of the conveyor with increasing attenuation and, with a maximum load of material to be conveyed, the natural frequency of the conveyor is approximately equal to the excitation frequency of the dual mass vibratory system; and regulating the vibration amplitude of the dual masses of the magnetic drive to a predetermined value.

2. A method as defined in claim 1, wherein the dual mass vibratory system includes a free side mass and a working side mass each coupled to the magnetic drive, and said setting step further comprises setting the natural frequency of the conveyor without a conveying load to a value which lies about 5% above the excitation frequency with a mass ratio between the working side mass and the free side mass adjusted to about 3 : 1.

3. A method as defined in claim 1, wherein said regulating step further comprises superposing a control for regulating a useful vibration amplitude of the conveyor for a given material to be conveyed to a predetermined value.

4. A method as defined in claim 1, wherein said regulating step further comprises regulating the vibration amplitude of the dual masses of the magnetic drive only after a predetermined vibration amplitude is reached.

5. A method as defined in claim 1, wherein said regulating step includes employing a control circuit having a pickup for detecting the actual vibration amplitude of the dual masses of the conveyor and a controller responsive to the actual vibration amplitude of the pickup and a desired amplitude value for the operating vibration amplitude for regulating the flow o energy to the magnetic drive, and configuring the control circuit to have a regulating response time which is greater than the period of the natural frequency of the conveyor.

6. A method as defined in claim 1, wherein said setting step includes setting the natural frequency of the conveyor in the no-load state so that the operating frequency resulting under maximum conveying load is equal to the excitation frequency of the signal exciting the magnetic drive.

7. A method as defined in claim 6, wherein the vibrating system includes a free side mass and a working side mass coupled together by the magnetic drive, and said setting step includes setting the natural frequency in the no-load state of the conveyor by adjusting the mass of the free mass.

8. A method as defined in claim 6, wherein the vibrating system includes a free side mass and a working side mass coupled together by the magnetic drive and a spring, and said setting step includes setting the natural frequency in the no-load state of the vibrating conveyor frame by adjusting the spring constant of the spring.

9. A drive arrangement for a vibrating conveyor, comprising:

a free mass;

a working mass;

an electromagnetic drive coupled between said masses for vibrating said masses, said electromagnetic drive being powered by a source of alternating voltage for vibrating said masses in accordance with a constant excitation frequency;

an actual value pickup disposed between said masses for producing a pickup signal having a value representing the actual vibration amplitude of said masses;

a comparator having a first input coupled for receiving a setting signal having a value representing a desired vibration amplitude of said masses, a second input connected to said pickup for receiving the pickup signal and an output for producing a signal corresponding to the difference between the pickup signal and the setting signal; and control means having an input connected to the output of said comparator means and an output connected to said electromagnetic drive for controlling the vibration amplitude of said masses to a predetermined value by controlling the amplitude of the alternating voltage applied to said electromagnetic drive, wherein the mass of said free mass is matched with the mass of said working mass so that the natural frequency of said vibrating conveyor is equal to the excitation frequency of said vibrating conveyor under maximum load.

10. An arrangement as defined in claim 9, wherein said control means comprises a phase angle controller.

11. An arrangement as defined in claim 9, wherein said control means comprises a phase chopper.

12. A drive arrangement for a vibrating conveyor, comprising:

a free mass;

a working mass;

an electromagnetic drive coupled between said masses for vibrating said masses, said electromagnetic drive being powered by a source of alternating voltage for vibrating said masses in accordance with a constant excitation frequency;

an actual value pickup disposed between said masses for producing a pickup signal having a value representing the actual vibration amplitude of said masses;

a comparator having a first input coupled for receiving a setting signal having a value representing a desired vibration amplitude of said masses, a second input connected to said pickup for receiving the pickup signal and an output for producing a signal corresponding to the difference between the pickup signal and the setting signal;

control means having an input connected to the output of said comparator means and an output connected to said electromagnetic drive for controlling the vibration amplitude of said masses to a predetermined value by controlling the amplitude of the alternating voltage applied to said electromagnetic drive; and a spring disposed between said free mass and said working mass, wherein said spring has a spring constant selected so that the natural frequency of said vibrating conveyor is equal to the operating frequency of said vibrating conveyor under maximum conveying load.

13. An arrangement as defined in claim 12, wherein said control means comprises a phase angle controller.

14. An arrangement as defined in claim 12, wherein said control means comprises a phase chopper.

* * * * *